US012348923B2

(12) United States Patent
Xue et al.

(10) Patent No.: US 12,348,923 B2
(45) Date of Patent: Jul. 1, 2025

(54) SYSTEMS, DEVICE ASSEMBLIES, AND METHODS FOR ACHIEVING ACOUSTIC SEAL AND INGRESS PROTECTION

(71) Applicant: Google LLC, Mountain View, CA (US)

(72) Inventors: Yao Xue, San Jose, CA (US); David J. Drennan, Mountain View, CA (US)

(73) Assignee: Google LLC, Mountain View, CA (US)

(*) Notice: Subject to any disclaimer, the term of this patent is extended or adjusted under 35 U.S.C. 154(b) by 90 days.

(21) Appl. No.: 18/041,263

(22) PCT Filed: Aug. 10, 2020

(86) PCT No.: PCT/US2020/045613
§ 371 (c)(1),
(2) Date: Feb. 10, 2023

(87) PCT Pub. No.: WO2022/035416
PCT Pub. Date: Feb. 17, 2022

(65) Prior Publication Data
US 2023/0319452 A1 Oct. 5, 2023

(51) Int. Cl.
*H04R 1/10* (2006.01)

(52) U.S. Cl.
CPC ......... *H04R 1/1016* (2013.01); *H04R 1/1058* (2013.01); *H04R 2201/105* (2013.01)

(58) Field of Classification Search
CPC ................ H04R 1/1016; H04R 1/1058; H04R 2201/105
See application file for complete search history.

(56) References Cited

U.S. PATENT DOCUMENTS

2007/0023380 A1 2/2007 Shingle et al.
2008/0017642 A1 1/2008 King
(Continued)

FOREIGN PATENT DOCUMENTS

CN 203734963 U 7/2014
CN 104122623 A 10/2014
(Continued)

OTHER PUBLICATIONS

"International Search Report and Written Opinion", Application No. PCT/US2020/045613, Apr. 6, 2021, 11 pages.
(Continued)

*Primary Examiner* — Sunita Joshi
(74) *Attorney, Agent, or Firm* — Colby Nipper PLLC

(57) ABSTRACT

An acoustically-sealed electronic device assembly comprising a first housing component, a second component, and a sealing element. The first housing component may have a locking element. The second component may have a threaded channel extending at least partially along a perimeter of the second component. The threaded channel may be sized to receive the locking element. The sealing element may be positioned at an interface between the first housing component and the second component. The locking element of the first housing component may be moved from a first non-engaged position to a second engaged position within the threaded channel of the second component. The sealing element may be compressed by the first housing component and the second component to form an acoustic seal at the interface.

26 Claims, 14 Drawing Sheets

(56) References Cited

U.S. PATENT DOCUMENTS

| | | | | |
|---|---|---|---|---|
| 2012/0195455 | A1* | 8/2012 | Chiba | H04R 1/1091 381/374 |
| 2014/0226937 | A1* | 8/2014 | Elenbaas | G02B 6/3887 385/87 |
| 2016/0066459 | A1 | 3/2016 | Rayner et al. | |
| 2016/0294106 | A1 | 10/2016 | Liu et al. | |
| 2018/0357523 | A1 | 12/2018 | Freienstein et al. | |

FOREIGN PATENT DOCUMENTS

| | | |
|---|---|---|
| EP | 1054477 | 11/2000 |
| JP | 2012156366 A | 8/2012 |
| WO | 2015100387 | 7/2015 |

OTHER PUBLICATIONS

"International Preliminary Report on Patentability", Application No. PCT/US2020/045613, Feb. 7, 2023, 9 pages.
"Foreign Office Action", CN Application No. 202080017898.7, May 25, 2024, 23 pages.
"Foreign Office Action", IN Application No. 202347012358, May 31, 2024, 6 pages.
"Foreign Office Action", CN Application No. 202080017898.7, Nov. 30, 2024, 15 pages.
Fu, et al., "Product Design: Functions and Structures", Beijing Institute of Technology Press, Jun. 30, 2008, 14 pages.
"Foreign Office Action", EP Application No. 20761672.3, Mar. 6, 2025, 6 pages.

* cited by examiner

SYSTEMS, DEVICE ASSEMBLIES, AND METHODS FOR ACHIEVING ACOUSTIC SEAL AND INGRESS PROTECTION

RELATED APPLICATION(S)

This application is a national stage entry of International Application No. PCT/US2020/045613, filed Aug. 10, 2020, the disclosure of which is incorporated herein by reference in its entirety.

BACKGROUND

In electronic devices, especially smaller handheld or wearable electronics, it is often desired to achieve a hermetic volume within the electronic device for acoustic purposes. This requires formation of a seal between the interface of two components that can create an acoustic seal and a hermetic volume inside of the device for acoustic purposes, as well as meets designated ingress protection codes or standards. The hermetic volume is one in which substantially no air, oxygen, other gases or contaminants can enter from the external environment under conditions of normal use. A hermetic or moisture-tight, air-tight barrier can be formed between the environment within the housing of the electronic device and the environment external to the housing.

An Ingress Protection ("IP") Code is generally governed by IEC standard 60529. Ingress Protection Code classifies and rates the degree of protection afforded by mechanical cases and enclosures against intrusion, dust, accidental contact and water. The ingress protection Code typically includes two numbers. A first number or digit rates degree of protection against dust and the second number rates degree of liquid ingress protection. For example, to design for a device that is dust tight and effective at liquid ingress for close range high pressure liquid, an ingress protection code of IP 69K may be selected. The first digit of the Ingress Protection Code may be the highest rating of "6" (dust tight). Similarly, the second digit of the Ingress Protection may be a "9K" (effective against high temperature water jets). While in some examples, it may be desired to have the highest ingress protection rating, there may be other examples where a much lower ingress protection rating is satisfactory given the intended use of the product or device.

Earbud assemblies are one example of electronic devices requiring an acoustic seal and hermetic volume within the device to achieve optimal acoustics. Sound waves that are broadcast from a speaker within the earbud assembly may be dampened due to audio leakage at the interface. High audio leakage can make it more difficult for a user to hear sounds from the speaker system. Further, audio performance can be reduced by dust or particulates that gather on one or more portions of the internal speaker system that can dampen the speaker's vibrations and result in reduced audio performance. The acoustic seal at an interface of components of an earbud assembly can minimize these problems. The acoustic seal typically requires the interface of two parts mating together to achieve a pre-determined grade of acoustic sealing. Achieving acoustic seal typically includes dispensing glue along the perimeter of the interface that is to be sealed, or an external compression force on elastomer gasket, such as a compression force created by screws, to ensure a seal along the interface perimeter. However, these traditional methods diminish the cosmetic appearance of a device, as well as require additional components to create external force, such as screws, which further add time and cost to the overall manufacturing of the device.

BRIEF SUMMARY

This application relates to the field of seal formation at the interface of two components, and particularly achieving acoustic seal at the interface of two components of a device or product.

An acoustically-sealed electronic device assembly according to an aspect of the disclosure includes a first housing component having a locking element, a second component having a threaded channel, and a sealing element. The threaded channel of the second component may extend at least partially along a perimeter of the second component and be sized to receive the locking element. The sealing element may be positioned at an interface between the first housing component and the second component. The locking element of the first housing component may be moved from a first non-engaged position to a second engaged position within the threaded channel of the second component. The sealing element may be compressed by the first housing component and the second component to form an acoustic seal at the interface.

In one example of this aspect, the device assembly is an earbud assembly, and the second component is a cap overlying the first housing component. The threaded channel may be a plurality of threaded channels extending along the perimeter, and the locking element is a plurality of locking elements. Movement of the cap around a portion of the first housing component causes movement of the locking elements along the threaded channel. According to another example of this aspect, the first housing component may further include a volume and when the acoustic seal is formed at the interface, the volume may become a hermetic volume.

According to another example, the interface may be a first interface, and the sealing element may be a first gasket. The device assembly may further include a second interface and a second gasket. Compression of the second gasket may form an acoustic seal at the second interface.

According to another example of this aspect, the first housing component may further include a volume and when the acoustic seal is formed at the interface, the volume may become a hermetic volume.

According to another example of this aspect, the interface may be a first interface, and the sealing element may be a first gasket. The device assembly may further include a second interface and a second gasket. Compression of the second gasket may form an acoustic seal at the second interface.

In still another example of this aspect, the threaded channel further includes an engaging recess having a wall surface. The locking element may include an engaging element configured to engage the wall surface of the engaging recess. Additionally, the locking element can further include a first leading end and a second opposed end. The engaging element may be positioned between the first leading end and the second opposed end of the locking element. Further, the engaging element may be a projection extending away from a main body of the locking element and configured to engage the engaging recess.

According to another example of this aspect, the locking element may be a cantilever having a first free end and a second opposed fixed end. The cantilever may be configured to move from a first biased position to a second compressed position within the threaded channel. The engaging recess may be positioned at a first end of the threaded channel, and the engaging element of the locking element may be positioned within the engaging recess.

An acoustic seal system according to another aspect of the disclosure includes a sealing element and a locking assembly for securing the first and second components together. The sealing element may be coupled to a first component and extend around a perimeter of a first component. The sealing element may be configured to engage a second component at an interface. The locking assembly may include a locking element on one of the first and second components; and a threaded channel on an other of the first and second components. The locking element may be moved through the threaded channel. The sealing element may be compressed so as to form an acoustic seal at the interface.

In one example of this aspect, the interface may be a first interface, the sealing element may be a first sealing element, and the acoustic seal may be a first acoustic seal. The seal system may further include a second sealing element that is coupled to the second component and that extends around a perimeter of the second component. The second sealing element may be configured to engage the first component at a second interface. Additionally, the first sealing element may be a first flexible gasket, and the second sealing element may be a second flexible gasket.

In accordance with another example of this aspect, one of the first and second components may be a cap of an earbud assembly, and an other of the first and second components may be a housing of the earbud assembly. The cap may be configured to enclose the housing when the locking element is moved through the threaded channel.

In still another example of this aspect, the system further includes an interior volume formed by the securing of the first and second components together. When the acoustic seal is formed at the interface, the interior volume is a hermetic volume.

In another example of this aspect, the threaded channel may further includes an engaging recess that has a wall surface. The locking element may include an engaging element configured to engage the wall surface of the engaging recess. Additionally, the locking element may be a cantilever having a first free end and a second opposed fixed end. The cantilever may be configured to move from a first biased position to a second compressed position within the threaded channel.

A method of forming another acoustic seal at an interface between a first component and a second component of an electronic device is disclosed according to another aspect of the disclosure. The method includes rotating the first component and the second component relative to one another, wherein the first component includes a locking element and the second component includes a threaded channel extending around at least a portion of a perimeter of the second component, and wherein the rotation moves the locking element along the threaded channel; interlocking the first and second components together by moving the locking element of the second component along the threaded channel of the first component until the locking element of the second component is placed into an interlocked position within an engaging recess of the threaded channel; and compressing, by the first and second components, a flexible According to one example of this aspect, the flexible sealing element may be a gasket, and the method may further include compressing the gasket until the first and second components are interlocked so as to form the acoustic seal.

In another example of this aspect, the electronic device may be an earbud assembly. One of the first and second components may be a cap. An other of the first and second components may be a housing. Interlocking the cap and the housing can further include forming an interior hermetic volume within the cap and the housing.

According to another example, the threaded channel further includes an engaging recess having a wall surface. The locking element may include an engaging element configured to engage the wall surface of the engaging recess. Additionally, the locking element can further include a first leading end and a second opposed end. The engaging element may be positioned between the first leading end and the second opposed end of the locking element. Further, the engaging element may be a projection extending away from a main body of the locking element and configured to engage the engaging recess.

According to another example, the locking element may be a cantilever having a first free end and a second opposed fixed end. The cantilever may be configured to move from a first biased position to a second compressed position within the threaded channel. The engaging recess may be positioned at a first end of the threaded channel, and the engaging element of the locking element may be positioned within the engaging recess.

DETAILED DESCRIPTION

Overview

Figure 1:
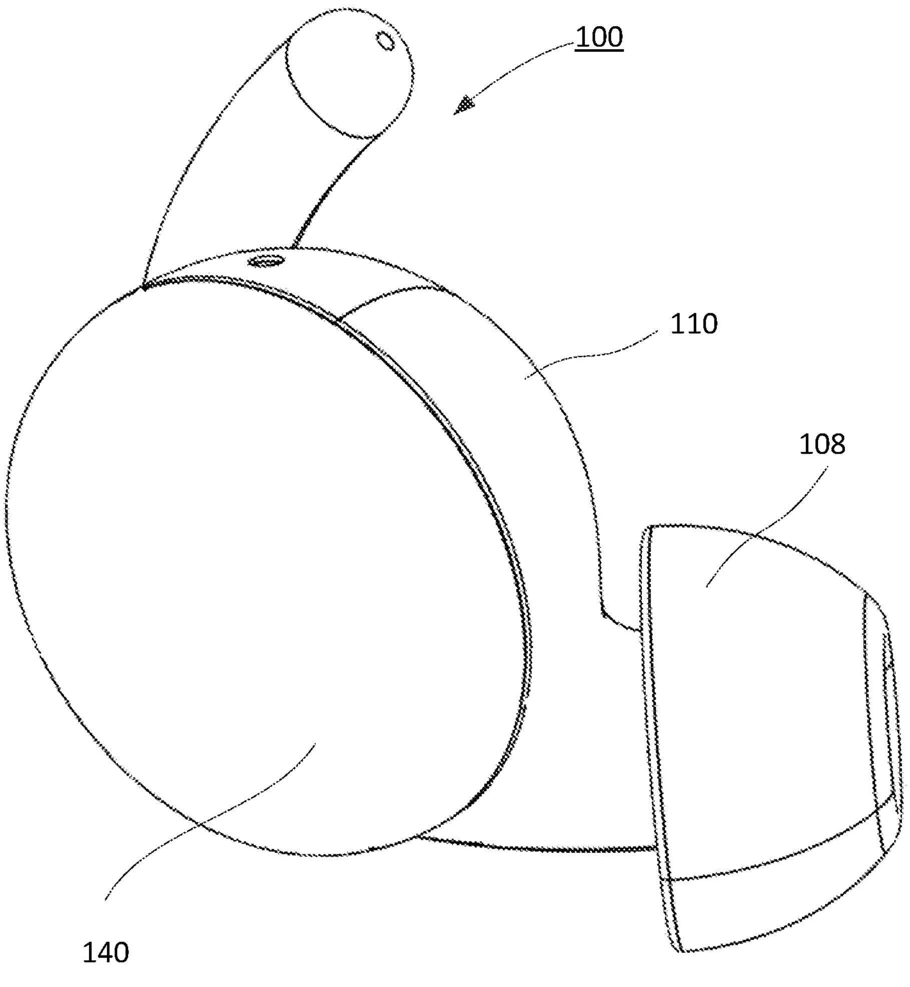
FIG. 1 is a perspective view of an example electronic device according to an aspect of the disclosure.

Sealing assemblies, methods, and devices incorporating sealing assemblies to achieve acoustic seal and that can meet ingress protection standards are disclosed. In particular, improved sealing assemblies for achieving an acoustic seal that meets ingress protection standards and that achieves hermetic volume within an electronic device are disclosed. The improved assembly can achieve an acoustic seal that meets ingress protection standards at the interface of two components of the device, as well as a hermetic volume without the need for an adhesive or secondary device external to the device to secure components of the outer housing of the electronic device together. The assembly can be used in any variety of electronic devices. Example electronic devices that incorporate assemblies according to aspects of the disclosure can include an earbud assembly, smart jewelry, such as a necklace or pendant, a smartwatch, smart glasses, or any other wearable electronic device. The methods, and devices disclosed herein can also be implemented within devices or products where a hermetic volume within the device is desired or where it is desired to achieve a secure lock, regardless of the need for achieving acoustic seal or specific ingress protection standards. These example products can include packaging for biologic samples, food delivery, confidential products, etc.

Devices and methods according to aspects of the disclosure can include a locking assembly with a locking element on a first component that is configured to slidably engage with a threaded channel on a second component, as well as compress at least one gasket at the interface between the first and second components. As the locking element travels along the threaded channel, compression of a gasket on at least one of the first and second components occurs until the locking element reaches a point along the threaded channel in which the locking element is secured or locked in place. While the locking element travels along the threaded channel, the at least one gasket is increasingly compressed until the two components are locked together. This assembly creates an acoustic seal that meets ingress protection Standards, as well as achieves a hermetic volume within the interior of the first and second components.

In a first example, the locking assembly can be implemented within any device, including electronic devices. The locking assembly may include a locking element that further includes engaging elements for engaging recesses in a threaded channel. Sliding engagement of the locking element within the recesses can cause one or more gaskets within the electronic device to become compressed and form a hermetic seal.

In an example where the electronic device is an earbud assembly, the locking element may be elongated with mechanical teeth positioned within the housing of the earbud assembly. The threaded channel may be found on the cap of the earbud assembly and may extend around at least a portion of the perimeter of the cap. An opening to the threaded channel may be aligned with the locking element on the housing to allow entry of the locking element into the threaded channel. The cap and housing can be rotated relative to one another so that the locking element moves within the threaded track. As the locking element travels along the threaded track, a gasket at one or more interfaces between the first and second components is compressed. Compression of the one or more gaskets will continue until engaging elements on the locking element engage with corresponding engaging recesses within the threaded channel. Once the teeth are secured within the engaging recesses, the cap and housing are secured to one another to form an acoustic seal, as well as a hermetic volume within the housing. The acoustic seal and hermetic volume can be achieved without the use of additional components, such as adhesive or a secondary device or component, such as screws, to secure the cap and housing together.

In a second example device assembly, the locking element may include a biasing cantilever that engages with a threaded channel. Sliding engagement of the biasing cantilever can cause one or more gaskets within the electronic device to become compressed and form an acoustic seal, as well as a hermetic volume. In the example where the electronic device is an earbud assembly, the locking element may be positioned within the housing of the earbud assembly and the threaded channel may be formed on a perimeter of the cap of the earbud assembly. The locking element, a biasing cantilever, can remain compressed within the threaded channel of a second component, as it travels along the threaded channel. The first and second component are movable relative to one another until the cantilever engages with a locking recess within the threaded channel. The engagement of the two components causes one or more gaskets within the electronic device to become compressed and form a hermetic seal.

In an example where the electronic device is an earbud assembly, the locking element may be positioned within the housing of the earbud assembly and the threaded channel may be formed within the cap of the earbud assembly. When the biasing cantilever is positioned at an entrance to the threaded channel, the cap can be rotated so that the cantilever moves within the threaded track. As the cantilever moves along the threaded track, the biasing cantilever is compressed, along with compression of a first gasket on the cap and a second gasket on the housing. Compression of the first and second gaskets will continue until the cantilever reaches an engaging recess within the threaded channel. Once the locking element is engaged with the recess, the cap and housing are secured to one another and an acoustic seal meeting Ingress protection standards can be met, as well as formation of a hermetic volume within the device.

Example Device Assemblies

The examples disclosed can achieve acoustic sealing at the interface where two components are joined together, along with a hermetic volume without the use of an adhesive or other structures or devices external to the device to seal two components together. For ease of discussion, reference will be made to formation of an acoustic seal, but it is to be understood that reference to an acoustic seal can include meeting a pre-determined Ingress protection standard at the interface between the two components, and can include formation of a hermetic volume within the device due to the formation of the acoustic seal.

Formation of an acoustic seal is one that does not allow for sound leakage at the sealed interface. Acoustic Seal can be defined as sound pressure level difference between the environment (outside of the seal) and the system (inside the seal). Acoustic seal is typically measured by a tester customized for a specific product form factor. In some examples according to aspects of the disclosure, an acoustic seal ensures that no more than 15 dBA of sound can be leaked from the interior of the assembly at the interface. The acoustic seal also prevents no more than 15 dBA of environmental sound from entering into the assembly from the exterior of the assembly, which could downgrade speaker acoustic performance. Similarly, an amount less than 15 dBA or greater than 15 dBA may be set as the threshold, depending on the overall design of the assembly. In still other examples, an acoustic seal at the interface can prevent leakage of sound at the interface can range from 10-20 dBA. Similarly, various Ingress protection ratings currently available can be concurrently achieved. According to aspects of the disclosure, a grade of sealing having an Ingress Protection rating of IPX2 to IPX4 can be achieved. In other examples, the ratings can vary, such that lower or varied ingress protection ratings at one or more interfaces is also possible. Finally, hermetic volume within the interior volume of the enclosed housing and cap can be concurrently achieved with at least an IPX2 to IPX4 rating.

FIG. 1 is an example electronic device that incorporates a sealing assembly with an improved acoustic seal. Example earbud assembly 100 can include a first component housing 110 that is secured to a second component cap 140, and an earbud tip 108. To ensure that substantially no air or contaminants, including moisture or dust, can enter earbud assembly 100 from the external environment, an acoustic seal that meets a predetermined Ingress Protection standard and creates a hermetic volume within the outer housing can be formed at the interface where the cap 140 and housing 110 meet and can provide compression to gaskets at one or more interfaces between the housing 110 and cap 140.

Figure 2:
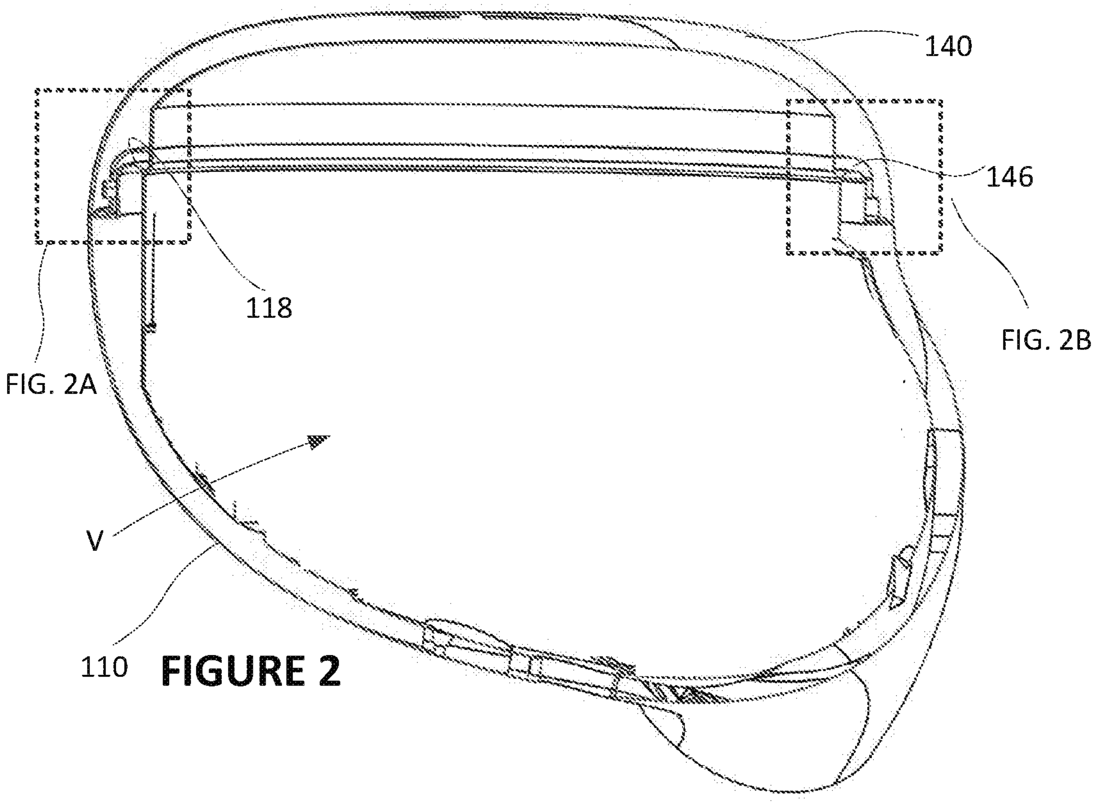
FIG. 2 is a schematic cross-sectional view of the example electronic device in FIG. 1.
Figure 2A:
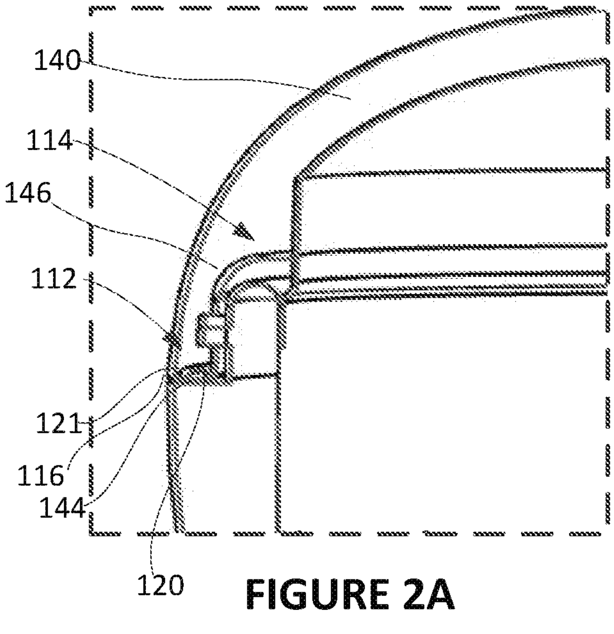
FIGS. 2A-2B are enlarged portions of FIG. 2.
Figure 2B:
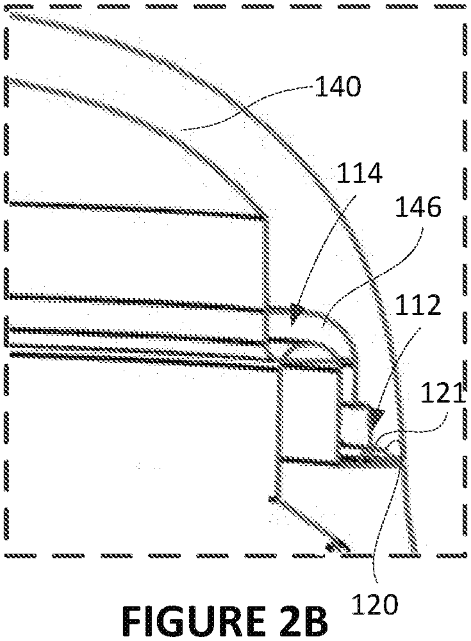

FIG. 2 is a schematic cross-sectional view of the earbud assembly 100, along with enlarged views FIGS. 2A-2B. For ease of illustration, and to focus the discussion on the interfaces between cap 110 and housing 110, the interior structure and other portions of earbud assembly 100 will not be illustrated in FIGS. 2-2B. Housing 110 may include an interior volume V that houses components necessary for operation of the earbud assembly, such as electrical circuitry, battery, insulation and the like (not shown). Cap 140 encloses the interior volume V of earbud assembly 100 when joined together with housing 110. As better illustrated in the enlarged views of FIGS. 2A-2B, a first interface 112 and a second interface 114 will be formed between housing 110 and cap 140. In other examples, only one interface is required or more than two interfaces may be provided. Acoustic seals will be formed at the first and second interfaces 112, 114.

First interface 112 may be formed between a top surface 121 of a seal or first gasket 120 that overlies a peripheral intermediate edge 116 of housing 110 and that mates with a bottom surface 144 of cap 140. (See also FIG. 3 discussed below.) Second interface 114 may be formed between a top edge surface 118 of housing 110 and another seal or second gasket 146 on cap 110. Joinder of housing 110 and cap 140 at the first interface 112 and second interface 114 allows for earbud assembly 100 to be acoustically sealed, as well as to meet Ingress Protection standards. Among others, compression of a first gasket 120 in housing 110 and a second gasket 146 in cap 110 by a locking assembly can form the acoustic seal. In other examples, only a single gasket may be implemented or more than two gaskets can be implemented to achieve acoustic seal.

Figure 3:
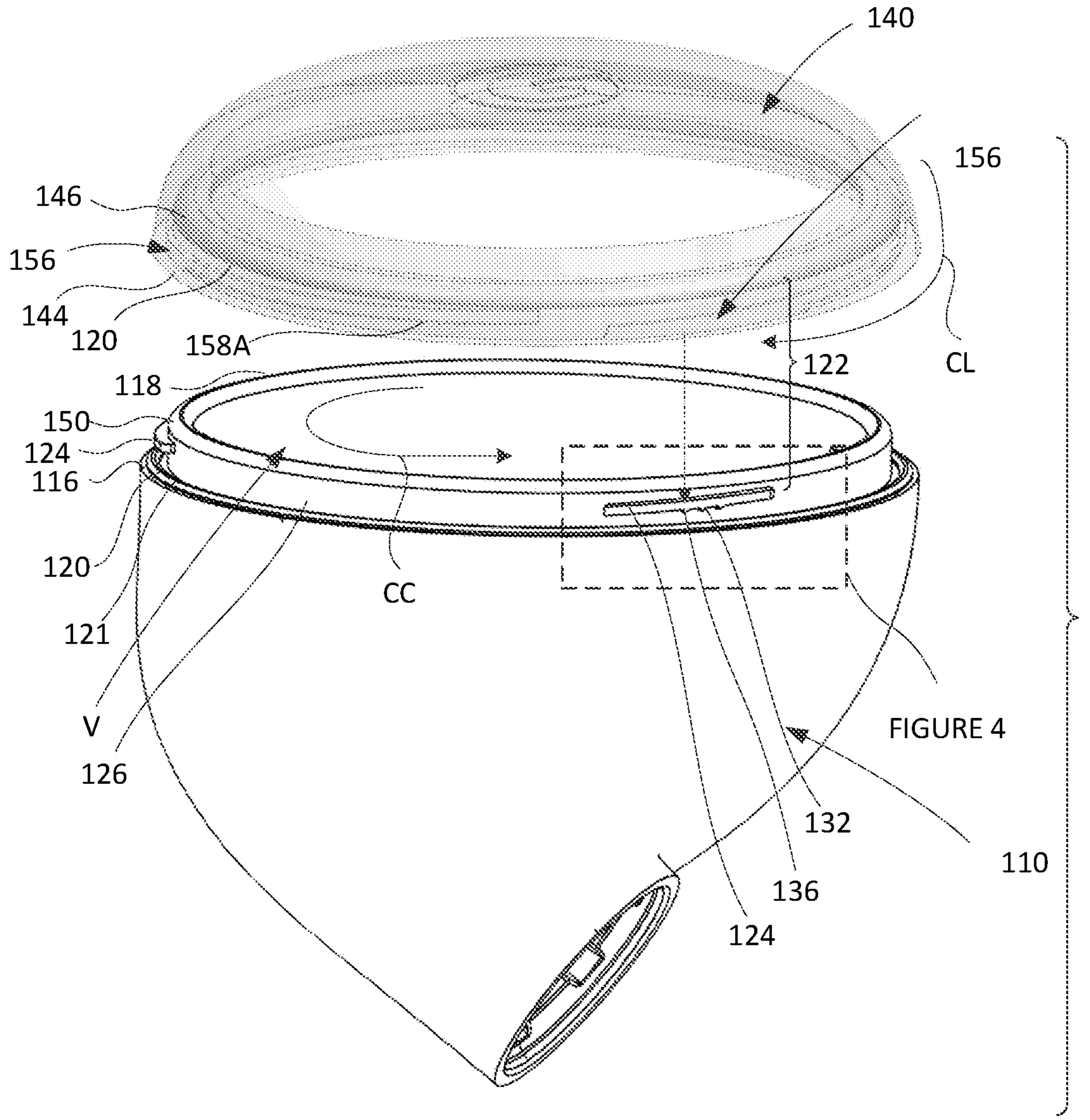
FIG. 3 is an exploded perspective view of components of the example electronic device.

FIG. 3 is an exploded view of housing 110 and cap 140 of earbud assembly 100, in which cap 140 is shown as transparent for ease of discussion and illustration. Cap 140 can be joined together with housing 110 to enclose the interior volume V of earbud assembly 100. A locking assembly can be used to secure housing 110 and cap 140 together, as well as compress first and second gaskets 120,146. An example locking assembly 122 can include at least one locking element on a first component that engages with a second component. In this example, locking assembly 122 can include one or more locking elements 124 positioned on or coupled to at least a portion of housing 110. As shown, locking elements 124 are positioned around an intermediate perimeter or peripheral wall 126 of housing 110. In this example, three locking elements 124 may be evenly and circumferentially spaced around peripheral wall 126 of housing 110, but less than three locking elements or more than three locking elements may be spaced at any desired spacing around a peripheral wall surface.

Locking element 122 can be attached, coupled to, or integrally formed on the housing. In this example, locking element extends or protrudes away from intermediate wall surface 126 of housing 110. As better illustrated in the enlarged view of locking element 124 in FIG. 3, locking element 124 is an elongated projection having a length L that is greater than its width W and height H. Locking element includes a leading first end 128 and an opposed second end 130. Engagement features 132 may be provided between first end 128 and second end 130. In this example, engagement features 132 are a plurality of protrusions or teeth extending downwardly from a bottom surface 134 of locking element 124. Three engagement elements 132A, 132B, 132C are illustrated, but fewer than three or more than three engagement elements 132 can be incorporated into the locking assembly 122. The engagement elements 132A-C may be mechanical teeth, each of which may have an engaging surface 136 that will engage recesses in cap 140, as will be discussed further herein, and prevent further movement of housing 110 and cap 140 relative to one another. Engagement elements 132A-C may also include a sliding surface 138 that will allow for movement of engagement elements along threaded channel 150 on cap 140 and across engaging recesses.

Figure 5:
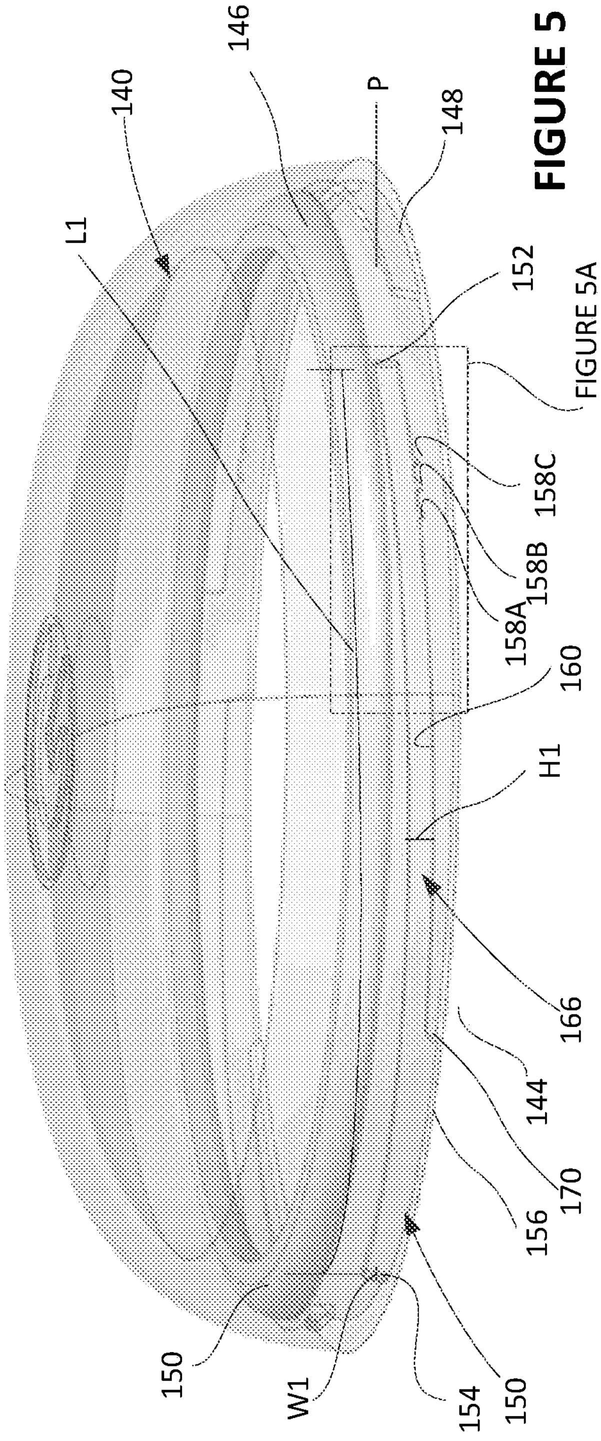
FIG. 5 is an example component of the example electronic device.
Figure 5A:
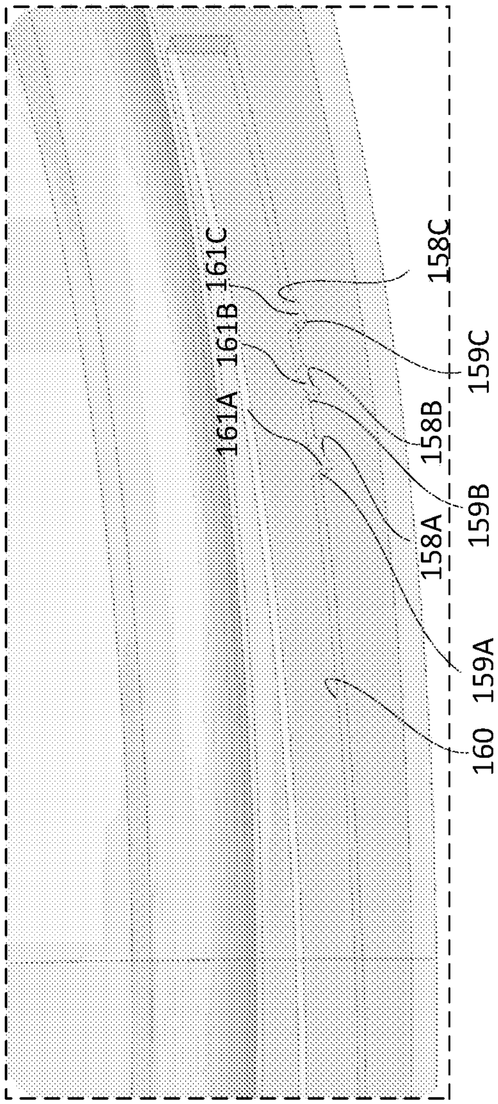
FIG. 5A is an enlarged portion of FIG. 5.

A securing or interlocking mechanism on cap 140 can engage with locking element 124 on housing 110 to secure housing 110 and cap 140 together, as well as allow for compression of the first and second gaskets 120, 146 and the resulting formation of an acoustic seal at any interfaces between the two device components. For example, a threaded channel on cap 140 can engage with locking element 124 on housing 110 to secure housing 110 and cap 140 together, as well as cause compression of the first and second gaskets 120, 146. Threaded channels 150 are shown in FIGS. 5-5A. As shown, a plurality of threaded channels 150 may extend around an interior surface 148 of cap 140, the number of threaded channels 150 corresponding to the number of locking elements 122 on housing 110. Each threaded channel 150 includes a first end 152 and an opposed second end 154, and may be an elongated channel that extends circumferentially around at least a portion of interior surface 148 of cap 140. Second end 154 of each threaded channel 150 may be positioned adjacent bottom surface 144 of cap 140 and first end 152 of each threaded channel 150 may be spaced away from bottom surface 144, such that any one threaded channel 150 does not extend in the same plane P around which bottom surface 144 of cap 140 extends. Channel 150 may instead extend at an angle around cap 140.

Along its circumferential length L1, channel 150 may have a height H1 and width W1 that is sufficient to receive a corresponding height H and thickness W of locking element 124. Height H1 can vary across its length L1. Entrance 156 to the threaded channel 150 may be provided between the first and second opposed ends 152,154. Entrance 156 may have an opening large enough to receive length L of locking element 124. As shown, entrance 156 may be recessed between an edge surface 153 at second end 154 and edge surface 170 of threaded channel, so that locking element can first be positioned within the threading of threaded channel 150, and then follow along bottom surface 160 of threaded channel 150.

Figure 4:
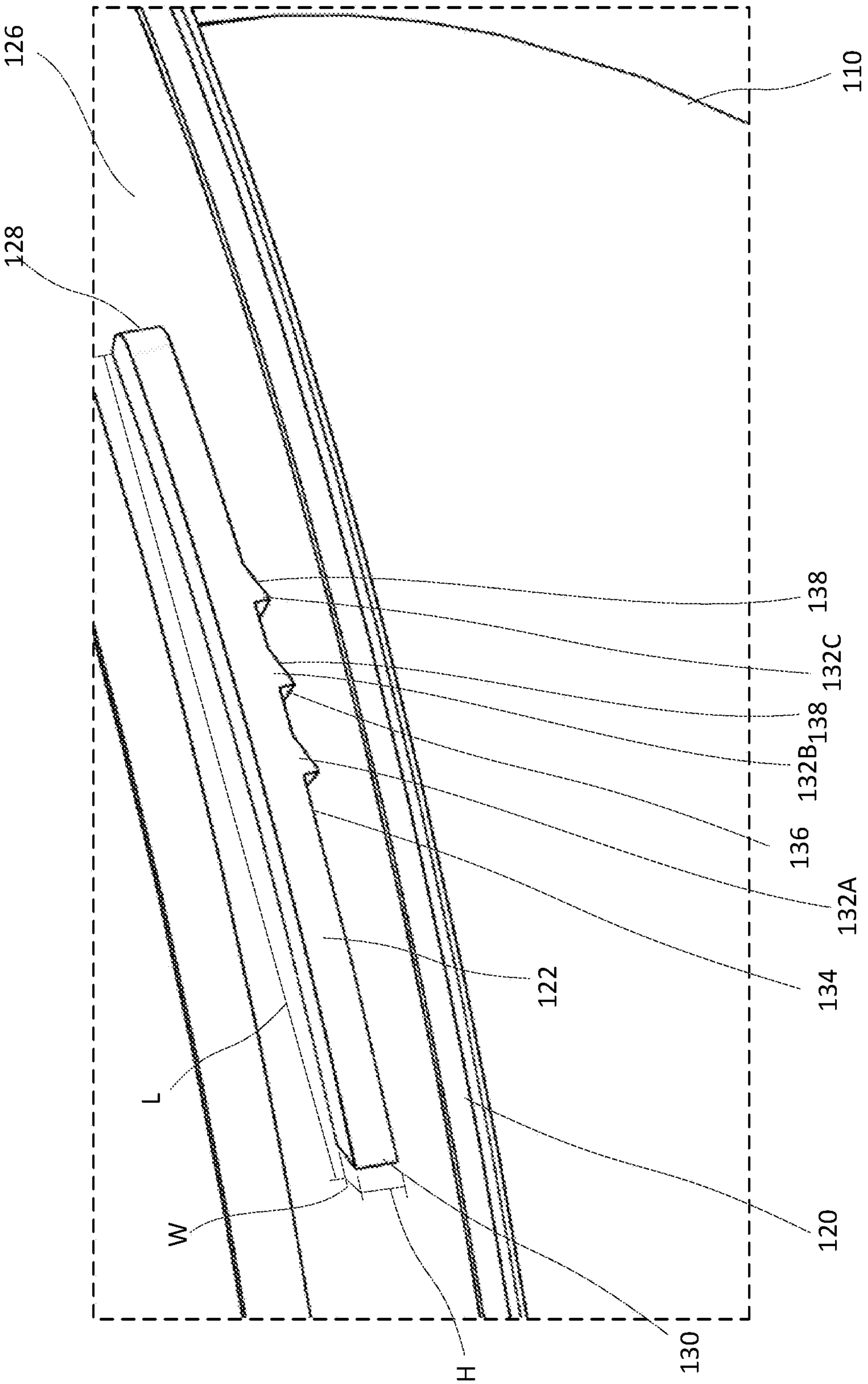
FIG. 4 is an enlarged portion of FIG. 3.

Threaded channel 150 may include one or more recesses to engage engaging elements 132 on housing 110. For example, as shown in FIG. 5A, threaded channel 150 may include three recesses 158A, 158B, 158C, although any number of recesses can be provided within channel 150. The recesses may be fewer than the corresponding number of engaging elements 132A-132C (FIG. 4) on housing 110, such as including one large recess to accommodate all engaging elements 132A-132C in one recess. Additional recesses may also be provided.

The recesses may include locking surfaces 159A, 159B, 159C that can inhibit movement of engaging elements 132A-132C (FIG. 4) in a direction against locking surface 159A-159C. Similarly, recesses 158A-158C may include a transition surface 161A, 161B, 161C that will receive locking elements 132A-132C, as well as allow locking elements 132A-132C to slide over and transition into the next recess.

The number of threaded channels 150 may vary and correspond to the number of locking elements 122 on housing 110. In this example, three channels 150 are provided around the circumference or perimeter of cap 140 and spaced approximately 120 degrees away from each other. These three channels 150 may be adapted to receive the three locking elements 122 on housing 110.

One or more sealing elements, components, or materials may be used in connection with the locking assembly 122 to fill space between the first and second interfaces and to prevent leakage at the first and second interfaces. For example, gaskets may be provided at first and second interfaces 112, 114. First gasket 120 may be positioned along edge 116 of housing 110 and extend around a periphery of the intermediate wall. The first gasket 120 can form a mechanical seal that seals the space or interface between housing 110 and cap 140. Second gasket 146 may be positioned within cap 140 and extend an interior periphery of cap 140. In other examples, the first and second gaskets can be respectively positioned on other interior or exterior portions of cap 140 and housing 110. First gasket 120 and second gasket 146 can be respectively made from the same or different materials, including rubber, TFE, Teflon, paper sheet, fiber, and any desired materials to help form the seal. The first and second gaskets may be O-rings and may also be flexible. Other types of filler devices or materials may be utilized, including solid material gaskets, spiral wound gaskets, flange gaskets and the like. Additionally, in some situations, a liquid sealant, paste, or the like can be implemented at the interfaces.

Figure 6:
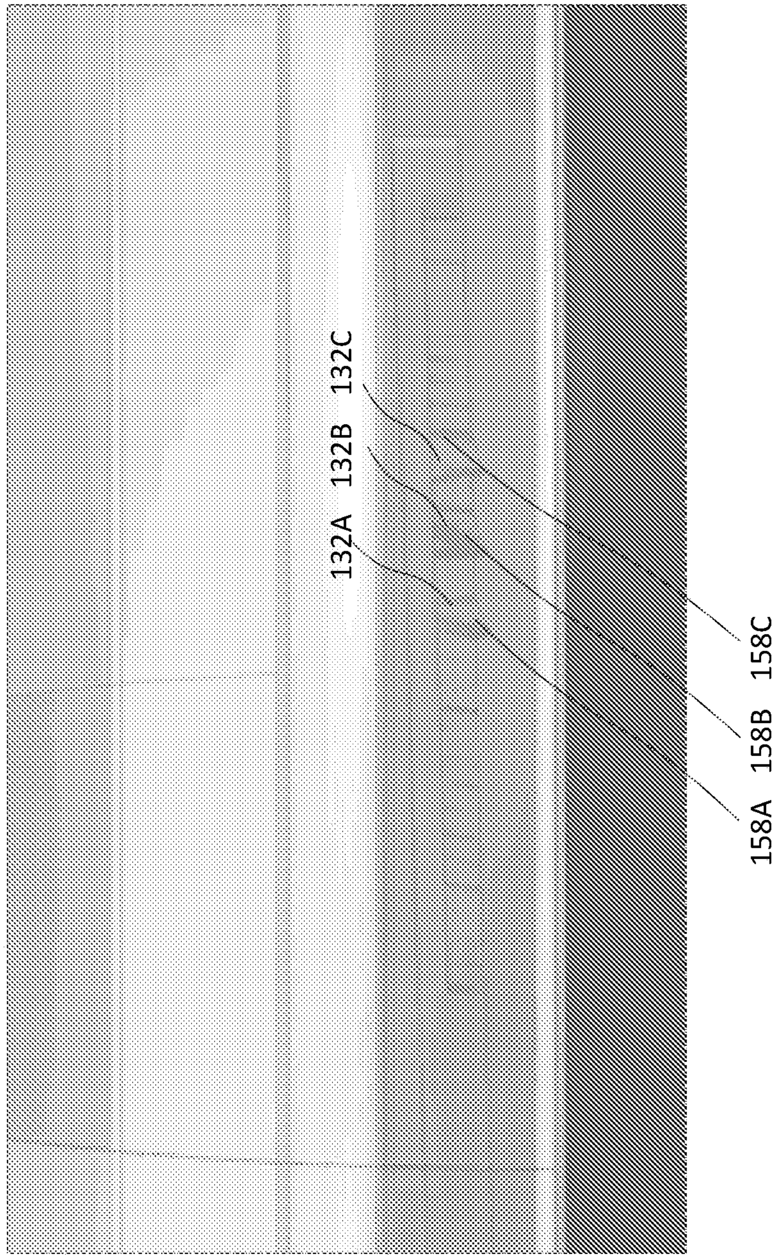
FIG. 6 is an enlarged view of an engaged locking assembly.

With reference back to FIG. 3, cap 110 may be joined together with housing 110. Each locking element 124 may be aligned with a corresponding entrance 156 to threaded channel 150. Once locking element 124 is positioned within entrance 156, one or both of cap 140 and housing 110 may be rotated relative to one another. In one example, cap 140 is rotated in a clockwise direction indicated by arrow CL to allow locking element 124 to move within main passageway 166 of channel 150. Housing 110 may be rotated in a counter-clockwise direction indicated by arrow CC. As cap 140 and housing 110 rotate, sliding surfaces 138 of engaging elements 132A-132C are angled to permit engaging elements 132A-132C to slide along bottom surface 160 of threaded channel 150, including across transition surfaces 160A-160C. Cap 140 and housing 110 may continue to be rotated until relative to one another and locking element 124 will continue to progress through channel 150 until leading end 128 of locking element 124 is adjacent first end 152 of threaded channel 150. As shown in FIGS. 5A and 6, in this position, engaging elements 132A-132C will be positioned within corresponding engagement recesses 158A-158B. Cap 140 can continue to rotate as engaging elements 132A-132C within main passageway 166 pass each recess. When leading end 128 of locking element 124 is adjacent first end 152 of threaded channel 150, cap 140 and housing can no longer rotate relative to one another, and cap cannot further rotate in the clockwise direction and locking element 124 can move no further in the counterclockwise direction within the threaded channel. First end 152 of threaded channel in cap 140 will prohibit further movement of locking element 124 within the threaded channel. Further, once engaging elements 132A-132C are positioned within corresponding engaging recesses 158A-158C of cap 140, movement of the cap 140 in the counterclockwise direction is also no longer possible. This is because engaging surfaces 136 of engaging elements 132A-132C on the outer housing 110 will be directly adjacent and prevented from moving by locking surfaces 159A-159C of engaging recesses 158A-158C.

As housing 110 and cap 140 cap are moved relative to one another, locking element 124 is rotated and moves along threaded channel 150. Compression of the first gasket 120 at the first interface 112 and compression of the second gasket 146 at the second interface 114 will occur, as shown in FIGS. 2-2B. First interface 112 will be formed between a top surface 121 of a first gasket 120 that overlies a peripheral intermediate edge 116 of housing 110 and that mates with a bottom surface 144 of cap 140. Second interface 114 is formed between a top edge surface 118 of housing 110 and second gasket 146 on cap 110. Joinder at the first interface 112 and second interface 114 allows for earbud assembly 100 to be acoustically sealed by compression of a first gasket 120 in housing 110 and a second gasket 146 in cap 110 by locking assembly 122

Other types of locking assemblies can be implemented within an electronic device or product to achieve an acoustic seal and a hermetic volume within the housing. With reference to FIGS. 7-10, another example earbud assembly 200 is illustrated. The exterior of earbud assembly 200 is otherwise identical to the earbud assembly 100, except for the addition of release openings 209 through cap 240, as discussed in more detail in FIG. 12. The interior portions of earbud assembly 200 only differ with respect to the locking assembly 222, as will be discussed in more detail.

Figure 7:
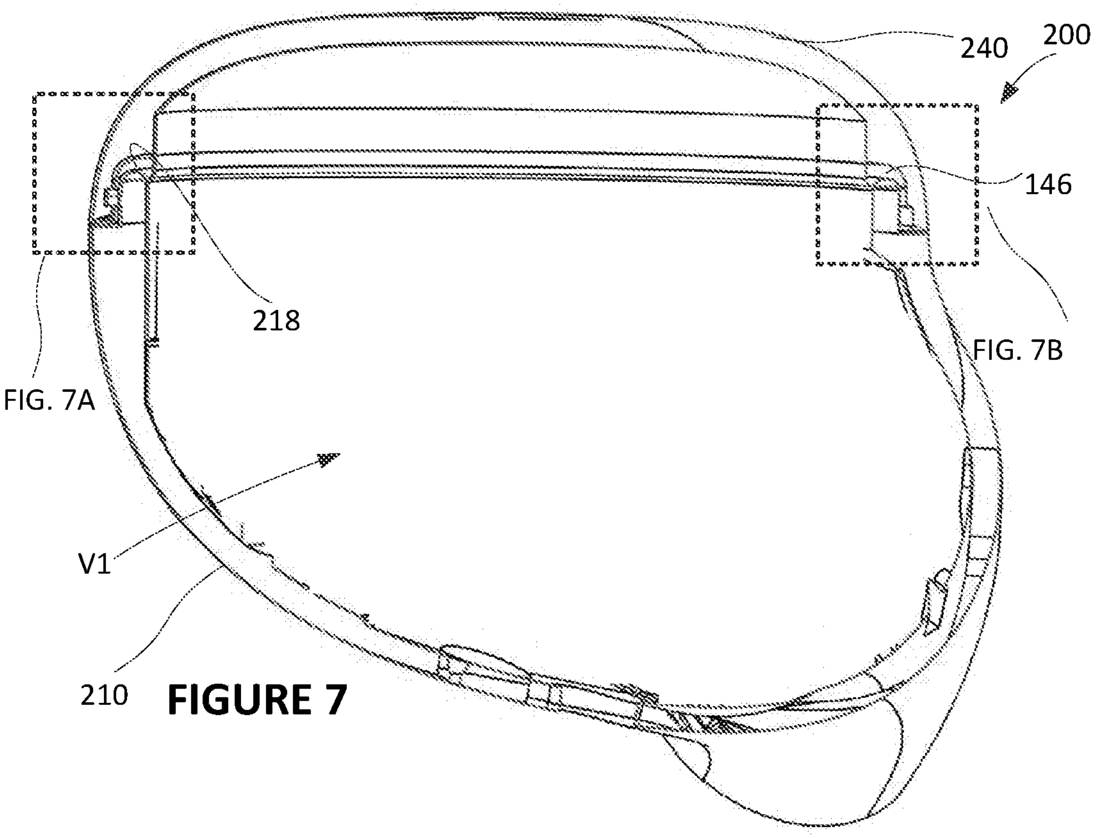
FIG. 7 is a schematic cross-sectional view of another example electronic device.
Figure 7A:
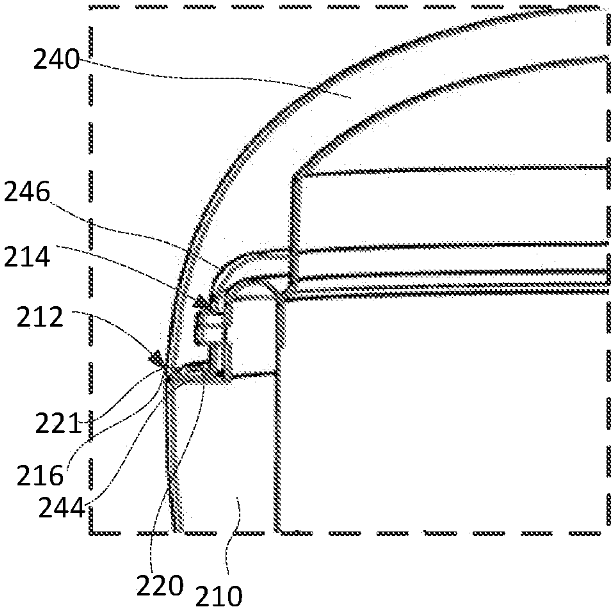
FIGS. 7A-7B are enlarged portions of FIG. 7.
Figure 7B:
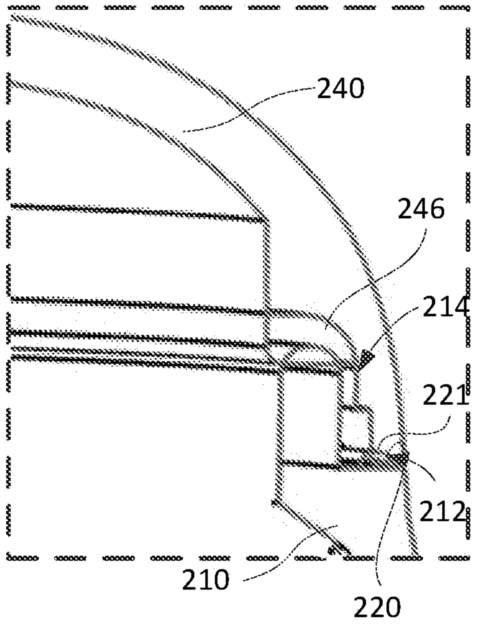

Turning first to FIG. 7, a schematic cross-sectional view of an earbud assembly 200 implementing another locking assembly is shown, along with enlarged views FIGS. 7A-7B. Example earbud assembly 200 can include a first component housing 110 that is secured to a second component cap 240, and an earbud tip (not shown). To ensure that substantially no air or contaminants, including moisture or dust, can enter earbud assembly 200 from the external environment, an acoustic seal that meets Ingress Protection standards and creates a hermetic volume within the outer housing can be formed at the interface where the cap 240 and housing 210 meet. Additionally, the housing 210 and cap 240 can provide compression to one or more gaskets at one or more interfaces between the housing 110 and cap 140.

The interior portions of assembly 200 illustrated in FIGS. 7A-7B are identical to the portions of assembly 100 shown in FIGS. 2-2A, since the locking assembly and release openings are not illustrated in these views. For example, as shown, housing 210 may include an interior volume V1 that houses components necessary for operation of the earbud assembly, such as electrical circuitry, battery, insulation and the like (not shown). Cap 240 encloses the interior volume V1 of earbud assembly 200 when joined together with housing 210. As better illustrated in the enlarged views of FIGS. 7A-7B, a first interface 212 and a second interface 214 can be formed at the junction between housing 210 and cap 240. In other examples, a single interface may be provided between housing 210 and cap 240, or more than two interfaces may be provided. Acoustic seals can be formed at each of the first and second interfaces 212, 214, according to aspects of the disclosure. These acoustic seals can also meet Ingress protection standards, as well as achieve a hermetic volume within the device.

First interface 212 may be formed between a top surface 221 of a first gasket 220 that overlies a peripheral intermediate edge 216 of housing 210 and that mates with a bottom surface 244 of cap 240. (See also FIG. 8 discussed below.) Second interface 214 may be formed between a top edge surface 218 of housing 210 and second gasket 246 on cap 240. Joinder of housing 210 and cap 240 at the first interface 212 and second interface 214 allows for earbud assembly 200 to be acoustically sealed and to meet Ingress protection Standards by compression of a first gasket 220 in housing 210 and a second gasket 246 in cap 240 by a locking assembly, as will be discussed in more detail below.

Figure 8:
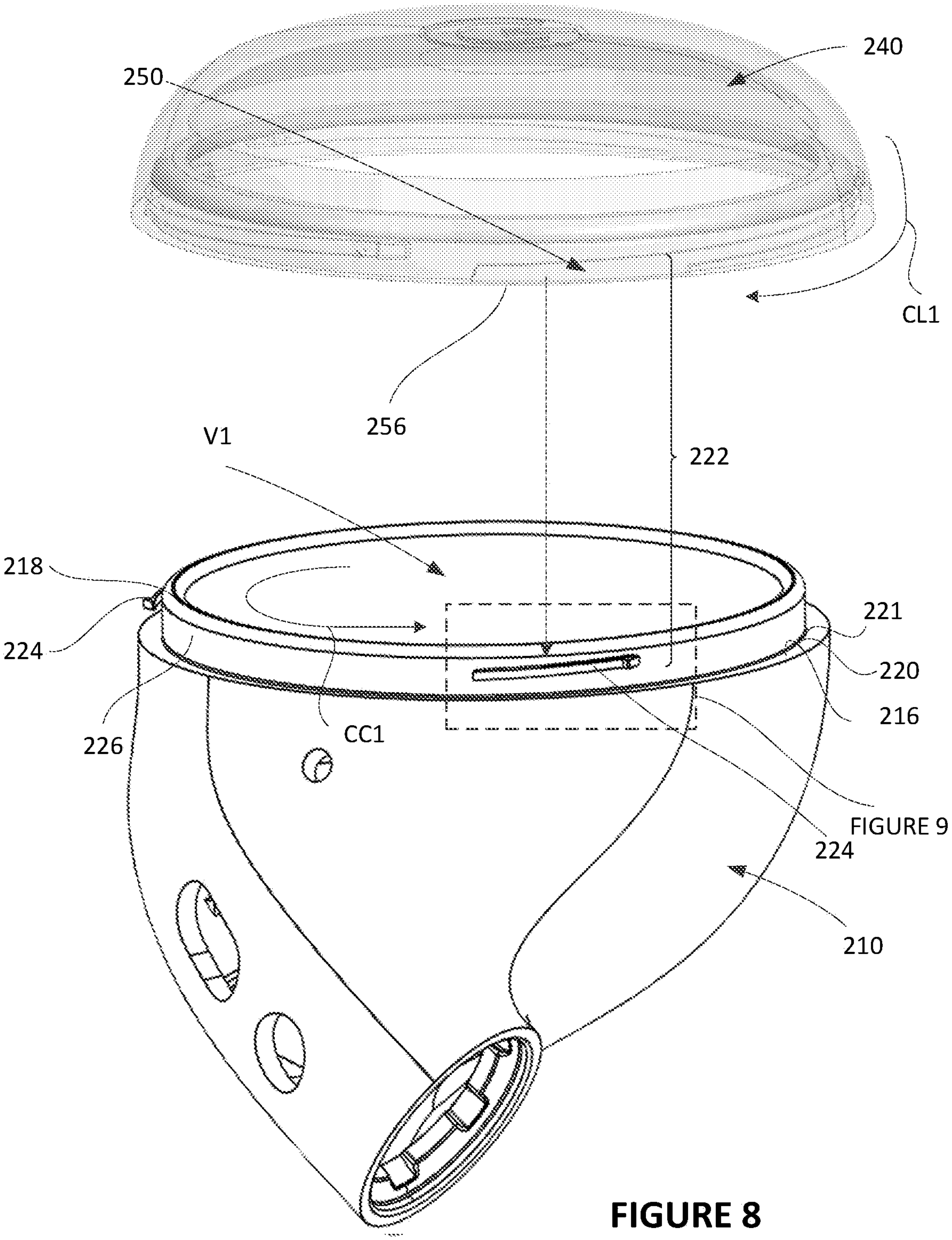
FIG. 8 is an exploded perspective view of components of the example electronic device.
Figure 9:
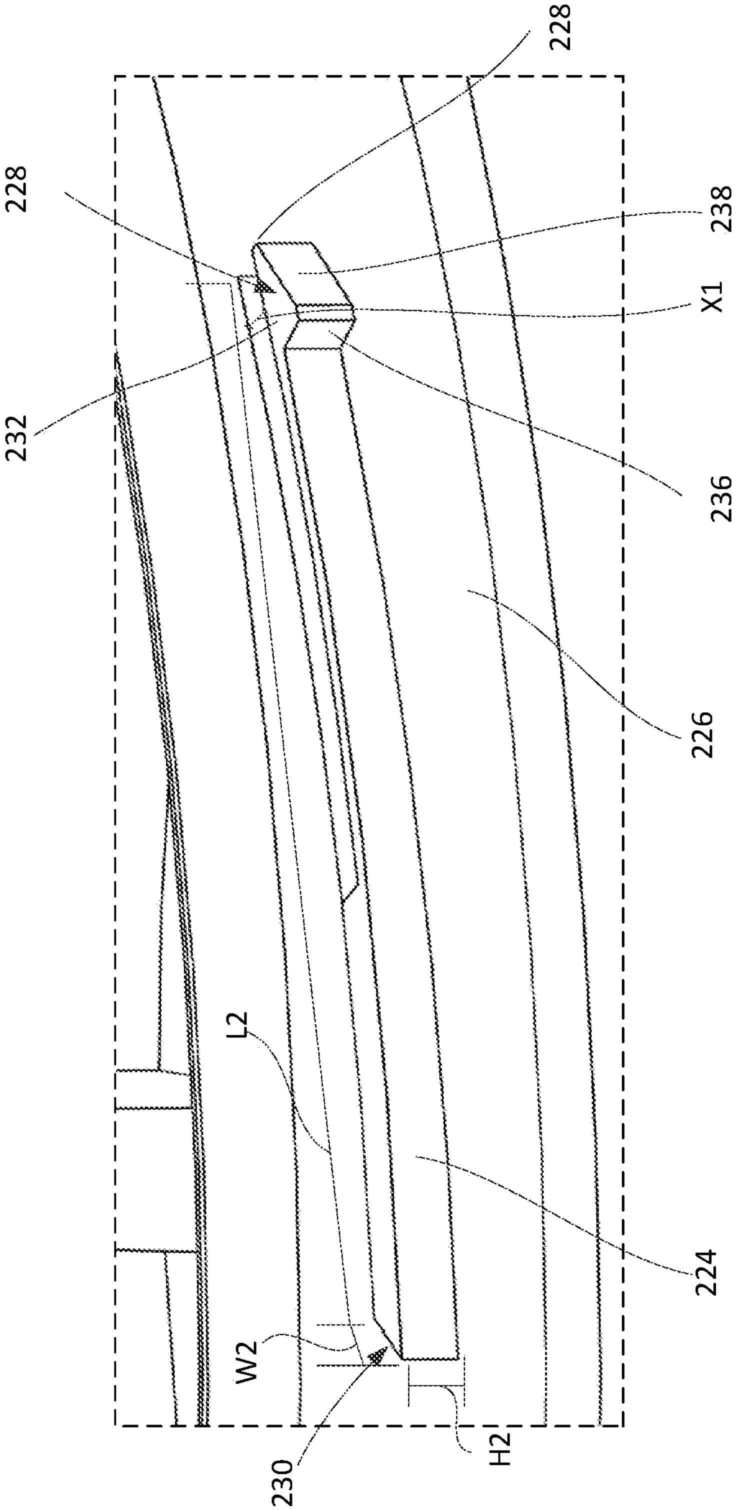
FIG. 9 is an enlarged portion of FIG. 8.
Figure 10:
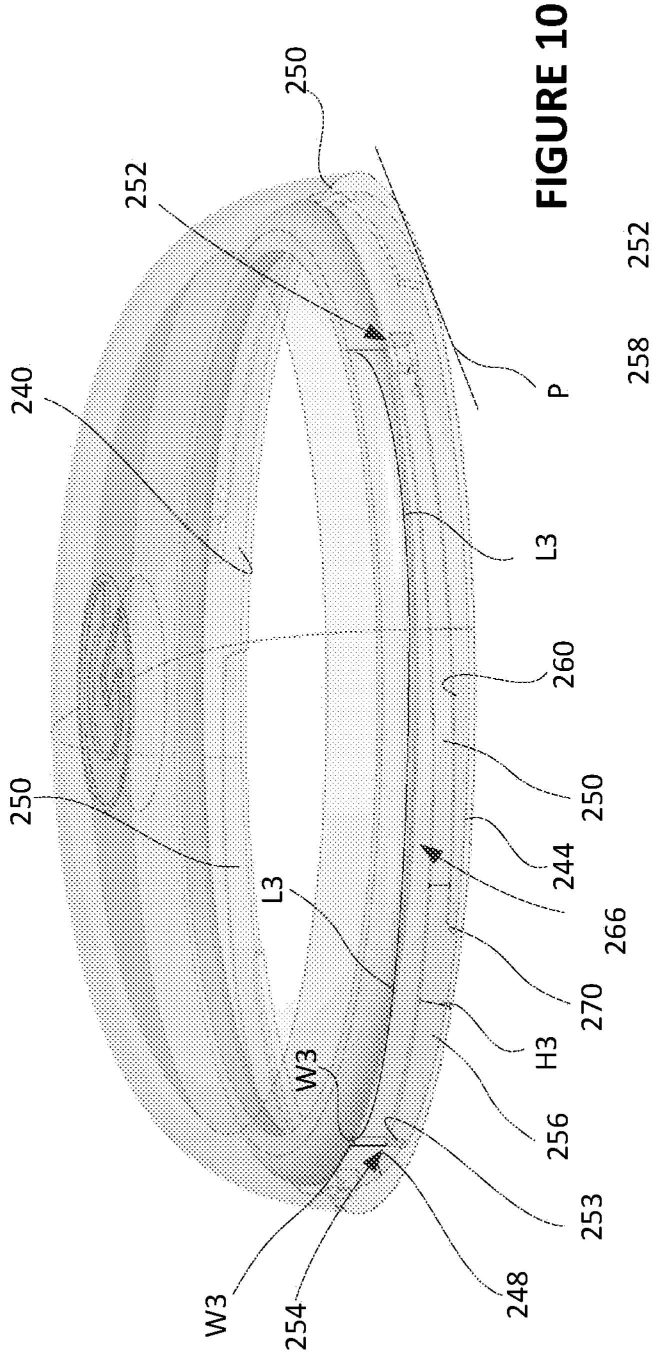
FIG. 10 is an example component of the example electronic device.

FIGS. 8-10 provide additional details regarding the components included as part of the locking assembly and that allow for the formation of acoustic seals at the first and second interfaces 212, 214. With reference to FIG. 8, an exploded perspective view of housing 210 and cap 240 of earbud assembly 200, is shown. Cap 240 is illustrated as transparent for ease of discussion and to better illustrate features on the interior surface of cap 240. Cap 240 can be joined with housing 210 to enclose the interior volume V1 of earbud assembly 200. A locking assembly can be used to secure housing 210 and cap 240 together, as well as compress first and second gaskets 220, 246 (FIG. 7) to form acoustic seals at the respective first interfaces. An example locking assembly 222 can include at least one locking element on a first component that engages with a second component. As shown, a plurality of locking elements 224 on or coupled to housing 210 may be evenly and circumferentially spaced around intermediate wall 226 of housing 210, but an even spacing is not required. In this example, three locking elements 224 are provided, but less than three locking elements or more than three locking elements may be spaced at any desired spacing intervals along the intermediate wall 226.

Each locking element 224 can be attached to, formed integrally with, or coupled to housing 210. In this example, locking element protrudes away from and extends around at least a portion of intermediate wall surface 226. Locking elements may also be positioned on other portions of housing 210. As better illustrated in the enlarged view of FIG. 9, locking element 224 may be elongated and have a length L2 that is greater than its width W2 and height H2. Locking element 224 may be a cantilever with a first free end and a second fixed end 230. Free end 228 may be biased in a direction away from intermediate wall surface 226, and in an at-rest biased or expanded position, free end 228 may be spaced a distance X1 away from intermediate wall surface 226.

Locking element 224 may include an engagement element 232 at free end 228 that can interlock with cap 240. In this example, engagement element 232 extends outwardly from locking element 224 in a direction away from intermediate wall surface 226. Locking element 224 is shown with only one engagement element 232, but more than one engagement element 232 can be incorporated into the locking element 224. Engagement element 232 can include an engaging surface 236 that will engage a locking surface in cap 240 and prevent further movement of housing 210 and cap 240 relative to one another. Engagement element 232 may also include a sliding surface 238 that will allow for movement of locking element 224 within cap 240 and in this example, along threaded channel 250 of cap 240.

Figure 10A:
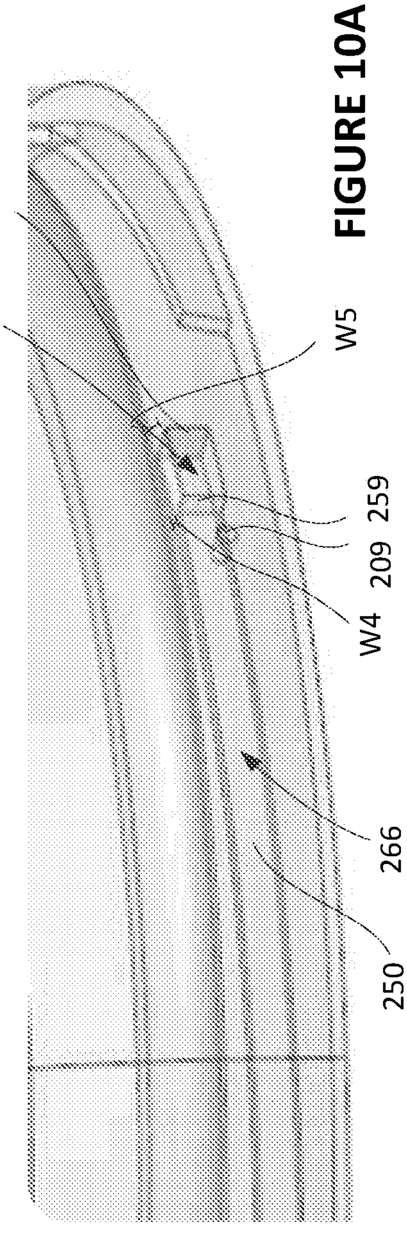
FIG. 10A is an enlarged portion of FIG. 10.

A securing or interlocking mechanism on cap 240 can engage with locking element 224 on housing 210 to secure housing 210 and cap 240 together, as well as allow for compression of the first and second gaskets 220, 246 and the resulting formation of an acoustic seal at any interfaces between the two device components. For example, threaded channels 250, as best seen in FIGS. 10-10A, can be provided within cap 240 to achieve an acoustic seal and to secure two components together. A plurality of threaded channels 250 may extend around an interior surface 248 of cap 240. The number of threaded channels 250 may vary and correspond to the number of locking elements 224 on housing 210. In this example, three channels 250 are provided around the circumference of cap 240 and spaced approximately 120 degrees away from each other. These three channels 250 are adapted to receive the three locking elements 224 on housing 210.

Each threaded channel 250 can include a first end 252 and an opposed second end 254, and may include a body in the form of a recess that extends circumferentially around at least a portion of interior surface 248 of cap 240. Second end 254 of each threaded channel 250 may be positioned adjacent bottom surface 244 of cap 240 and first end 252 of each threaded channel 250 may be spaced away from bottom surface 244, such that any one threaded channel 250 does not extend in the same plane P around which bottom surface 244 of cap 240 extends. Channel 250 may instead extend at an angle around cap 240 and between first end 252 and second end 254. As shown, channel 250 can have a positive slope extending in a direction from second end 254 to the first end 252.

Height H3 and width W2 of threaded channel 250 may vary along its circumferential length L3. At any point along channel 250, height H3 and width W3 are sized to receive a corresponding height H2 and thickness or width W2 of locking element 224 as well as allow for movement of locking element 224 along threaded channel 250. Entrance 256 to the threaded channel 250 may be provided between the first and second opposed ends 252, 254. Entrance 256 may have an opening large enough to receive length L2 of locking element 224. As shown, an entrance 256 may be recessed and defined by edge surface 253 at second end 254 of threaded channel 250 and edge surface. This will allow for placement of locking element 224 within the threading of threaded channel 250. Locking element 224 may then follow along bottom surface 260 of threaded channel 250.

Threaded channel 250 may include a recess to receive engaging elements 232 on housing 210. For example, as shown in FIG. 10A, threaded channel 250 may include an engaging recess 258 adjacent first end 252 of threaded channel. Engaging recess 258 may have a width W5 that is greater than the width W4 of a portion of the channel just prior to the engaging recess 258. Locking surface 259 can inhibit movement of locking element 224 in a direction against locking surface 259.

One or more sealing elements, components, or materials may be used in connection with the locking assembly 222 to fill space between the first and second interfaces and to prevent leakage at the first and second interfaces, as previously discussed above. For example, gaskets may be provided at first and second interfaces 212, 214. A first gasket 220 may be positioned along edge 216 of housing 210 and extend around a periphery of the intermediate wall, which can form a mechanical seal that seals the space or interface between housing 210 and cap 240. Second gasket 246 may be positioned with cap 240 and extend an interior periphery of cap 240. In other examples, the first and second gaskets can be respectively positioned on other interior or exterior portions of cap 240 and housing 210. First gasket 220 and second gasket 246 can be made from known materials including rubber, TFE, Teflon, paper sheet, fiber, and any desired materials to help form the seal. The first and second gaskets may be O-rings and may also be flexible. Other types of filler devices or materials may be utilized, including solid material gaskets, spiral wound gaskets, flange gaskets and the like. Additionally, in some situations, a liquid sealant, paste or the like can be implemented at the interfaces.

With reference back to FIG. 8, cap 240 may be joined together with housing 210 to enclose volume V1 and create an acoustic seal at one or more interfaces between cap 240 and housing 210. Each locking element 224 on housing 210 may be aligned with a corresponding entrance 256 to threaded channel 250. Once locking element 224 is positioned within entrance 256, one or both of cap 240 and housing 210 may be rotated relative to one another. In one example, cap 240 is rotated in a clockwise direction indicated by arrow CLI to allow locking element 224 to move within channel 250. Housing 210 may be rotated in a counter-clockwise direction indicated by arrow CC1. When rotated, locking element 224 will move from entrance 256 over edge 270 and into main passageway 266 of threaded channel 250. As cap 240 and housing 210 rotate, engagement element 232 of locking element 224 is compressed so that the first end and engagement element 232 of locking element 224 are pressed against interior wall surface 248 of housing 210. Engagement element 232 and leading free end 228 of locking element 224 will continue to be compressed as locking element 224 travels along threaded channel 250. Sliding surface 238 of engaging element 232 may be an angled surface to permit engaging element 232 to slide along interior wall surface 248 of threaded channel. Cap 240 and housing 210 may continue to be rotated relative to one another, as locking element 224 progresses through main passageway 266 of threaded channel 250 until engaging element 232 is adjacent first end 252 of threaded channel 250.

While housing 210 and cap 240 cap are moved relative to one another, locking element 224 is rotated and moves along threaded channel 250. This will also cause compression of the first gasket 220 at the first interface 212 and compression of the second gasket 246 at the second interface 214 will occur, as shown in FIGS. 7-7B.

Figure 11:
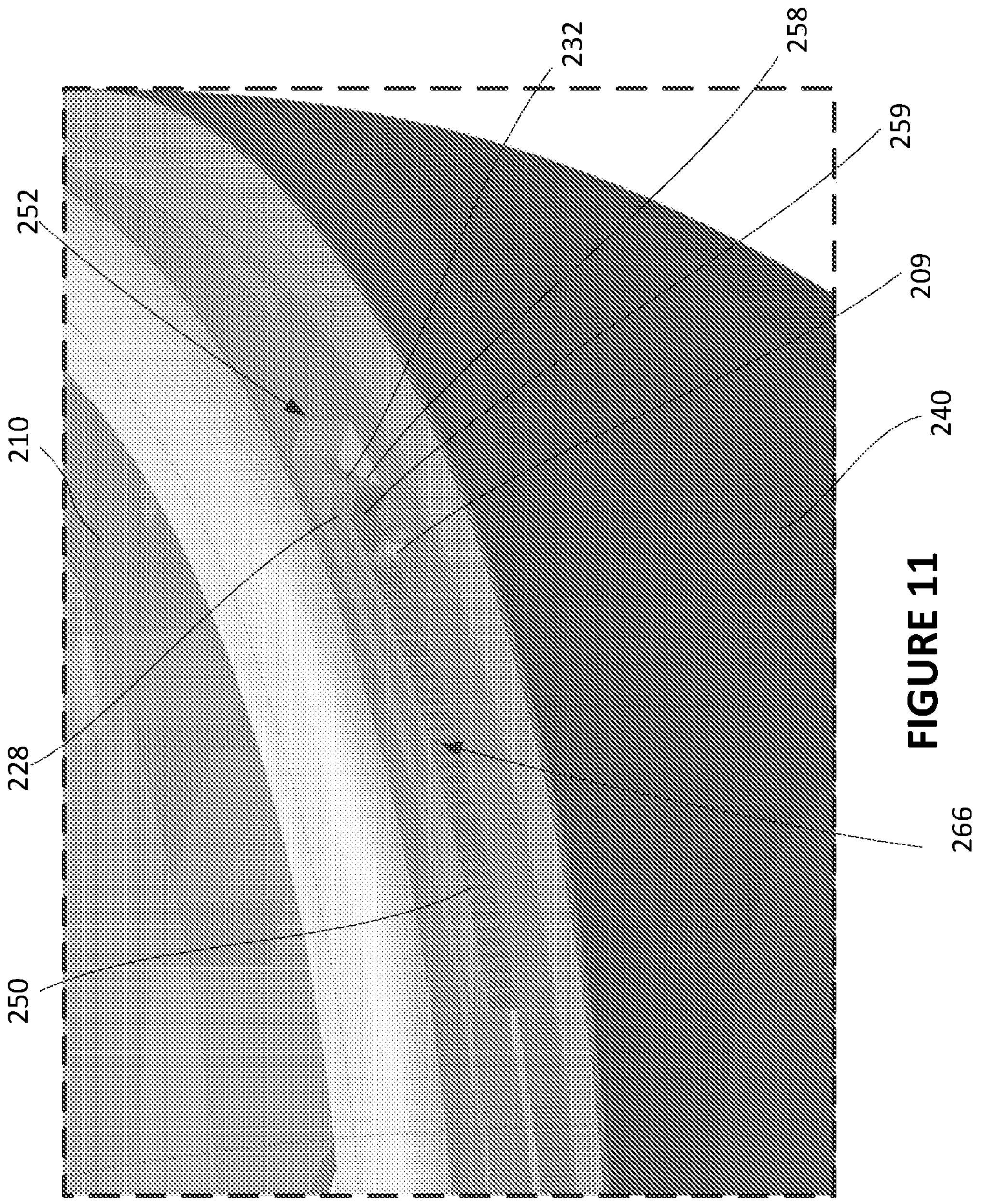
FIG. 11 is an enlarged view of an engaged locking assembly according to aspects of the disclosure.

As shown in FIG. 11, when leading and free end 228 of locking element 224 reaches first end 252 of threaded channel 250, engagement element 232 of housing 210 will be positioned within engaging recess 258 of threaded channel 250 in cap 240. The area within engaging recess 258 is greater than the area along the main passageway 266, which will allow for leading and free end 228 to expand from a compressed state within the main passageway to an expanded position within the engaging recess 258. The expansion can cause engagement element 232 to snap into a locked position within recess 250.

In the locked position, cap 240 and housing 210 can no longer rotate relative to one another. Cap 240 cannot further rotate in the clockwise direction and locking element 224 can move no further in the counterclockwise direction within the threaded channel 250. First end 252 of threaded channel in cap 240 will prohibit further movement of locking element 224 within the threaded channel. Further, once engaging element 232 is positioned within corresponding engaging recess 258 of cap 240, movement of the cap 240 in the counterclockwise direction is no longer possible. This is because engaging surfaces 236 of engaging element 232A on the outer housing 210 will be directly adjacent and prevented from moving by locking surface 259 of engaging recess 258.

The first interface 212 will be formed between a top surface 221 of a first gasket 220 that overlies a peripheral intermediate edge 216 of housing 210 and that mates with a bottom surface 244 of cap 240. Second interface 214 can be formed between a top edge surface 218 of housing 210 and second gasket 246 on cap 240. With engagement element in place within engaging recess, first and second gaskets 220, 246 will be fully compressed at the first interface 212 and second interface 214. This can allow for earbud assembly 200 to be acoustically sealed by compression of a first gasket 220 in housing 210 and a second gasket 246 in cap 240 by locking assembly 222.

Figure 12:
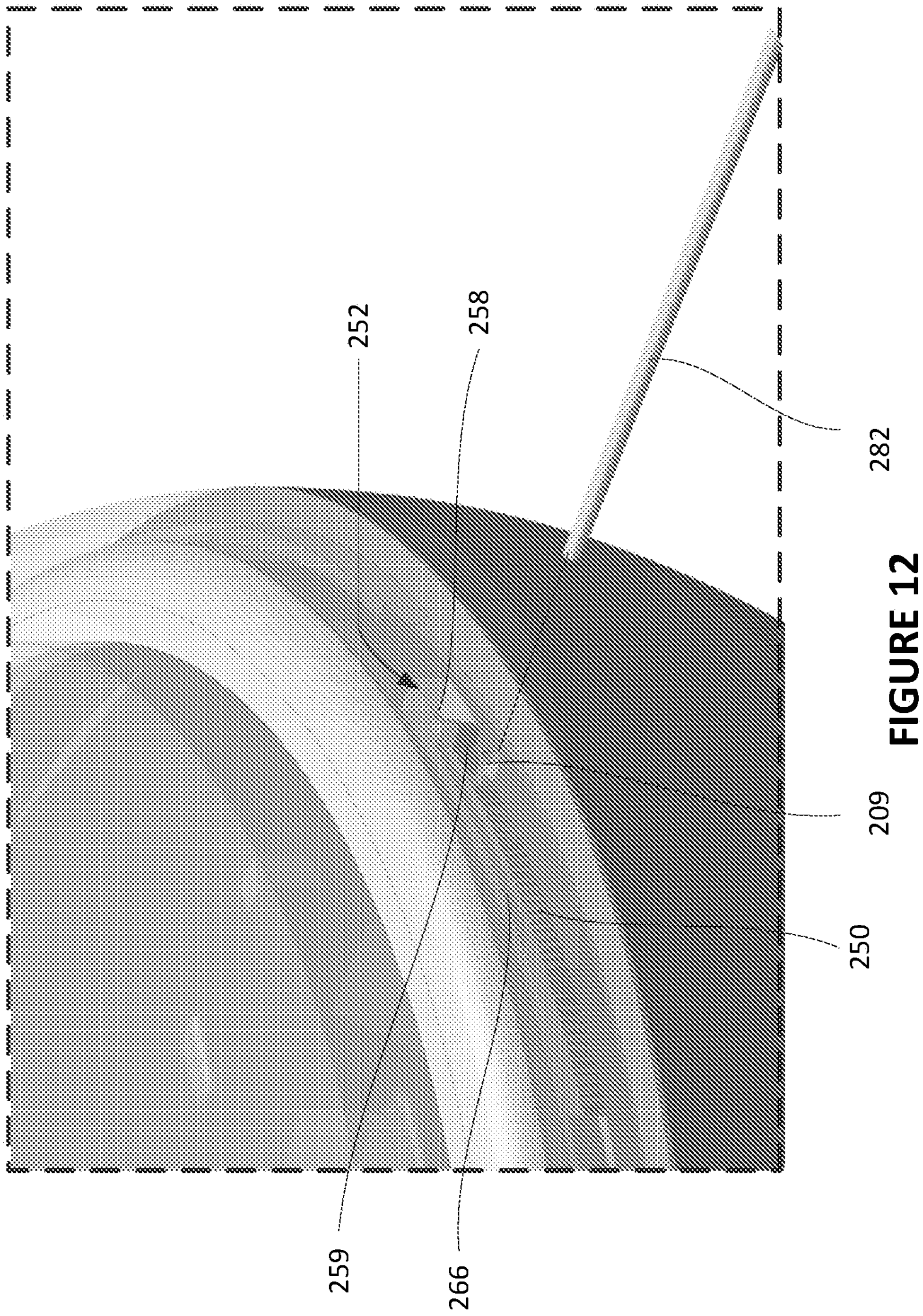
FIG. 12 is an enlarged portion of the electronic device and an example release device according to an aspect of the disclosure.

To separate cap 240 and housing 210, locking element 224 of the housing 210 must be released or disengaged from the threaded channel 250 of the cap. With reference to FIG. 12, cap 240 includes a release opening 209 within threaded channel 250. The release opening 209 can extend through a thickness of cap 240 and be positioned at a point along the passageway where locking element 224 can be compressed. For example, release opening 209 can be provided with or aligned with the main passageway 266 of threaded channel 250 adjacent first end of threaded channel 250 or the release opening may be positioned at engagement recess 258. As shown in this example, release opening 209 is positioned adjacent engaging recess 258.

A secondary device, such as a pin 282, can be inserted into release opening 209 to release locking element 224 from threaded channel 250. Insertion of pin 282 compresses free end 228 so that engaging element 232 no longer contacts locking surface 259 of channel 250 and is otherwise disengaged from engaging recess 258. Cap 240 may then be rotated in a counterclockwise direction so that locking element 224 now travels in a reverse direction in a direction from first end of threaded channel 250 toward the second end of threaded channel 250. Once locking element 224 is positioned at the entrance of threaded channel 250, cap 240 and housing 210 can be separated from one another.

Figure 13:
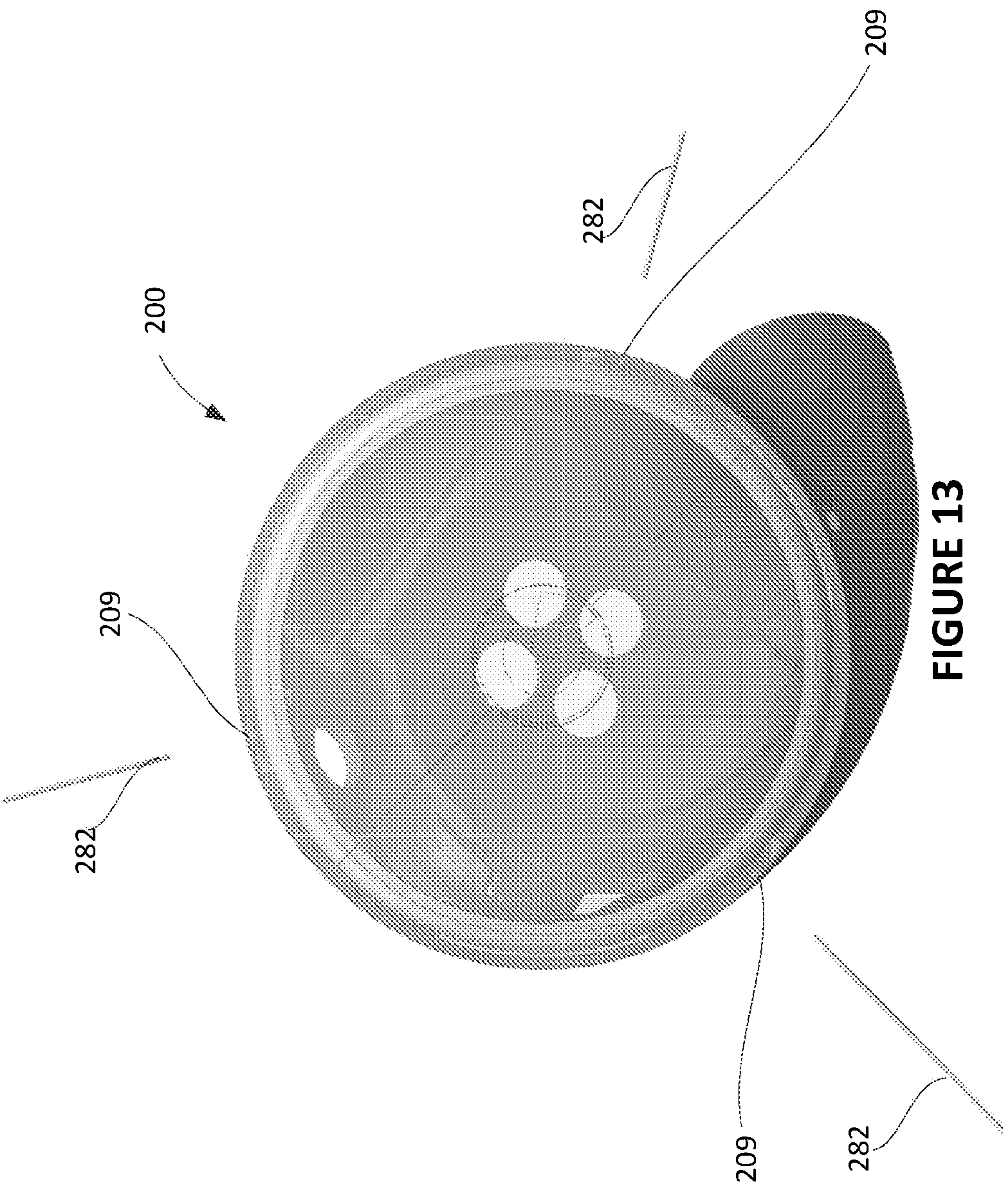
FIG. 13 is a front perspective view of the electronic device and example release devices according to an aspect of the disclosure.

As shown in FIG. 13, a release opening 209 can be provided adjacent to each of the locking elements, and three pins 282 can be utilized to extend through cap 240 and compress locking assembly 222. Requiring three external pins to simultaneously compress respective locking elements can be helpful to deter users from opening up the device, and instead turning to professionals to perform any necessary repairs.

Figure 14:
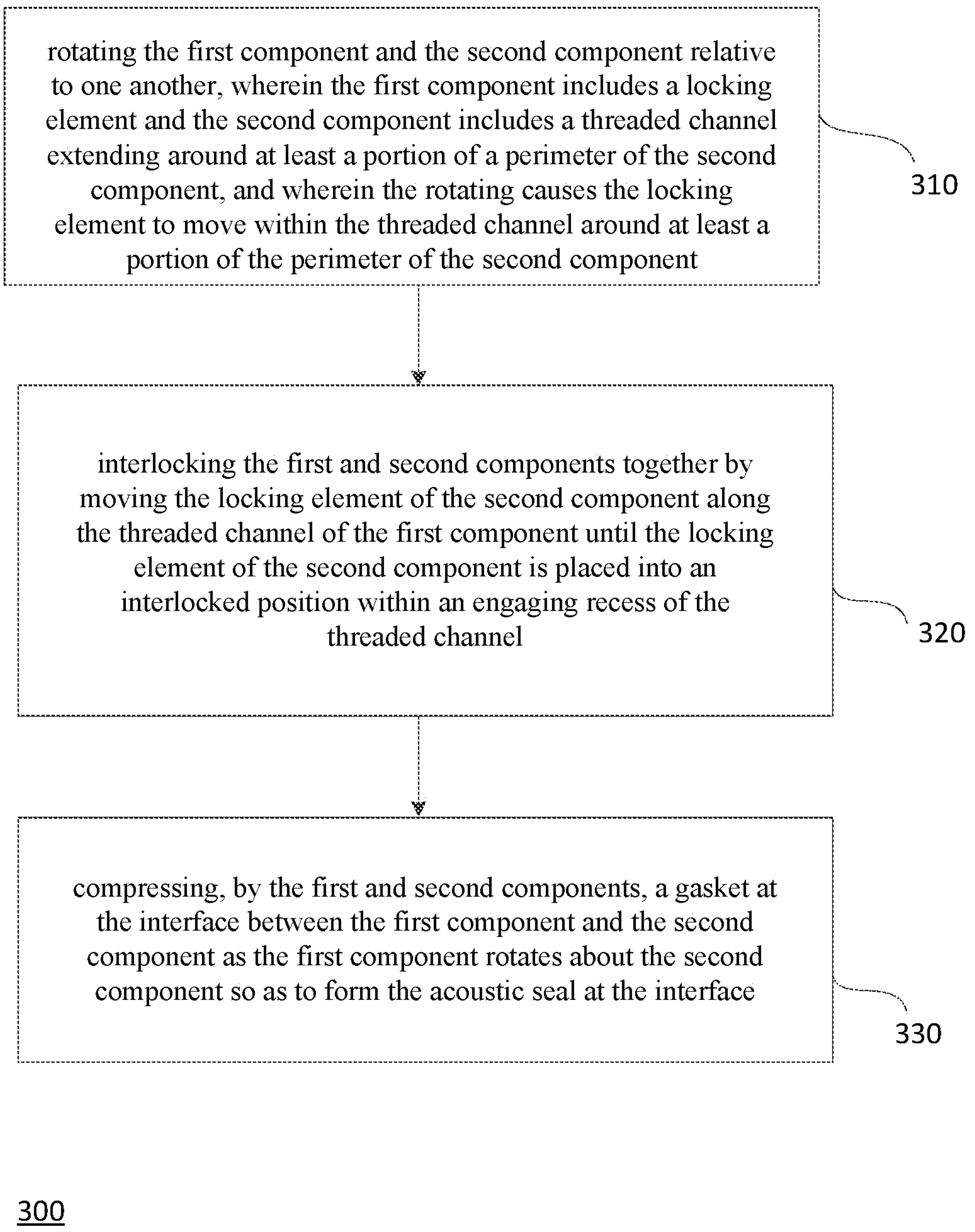
FIG. 14 is a flow chart of an example method according to aspects of the disclosure.

With reference to FIG. 14, an example method 300 of forming an acoustic seal at an interface between a first component and a second component of an electronic device is disclosed. The method includes at block 310 rotating the first component and the second component relative to one another. The first component may include a locking element and the second component may include a threaded channel extending around at least a portion of a perimeter of the second component. Rotation of the first and second components relative to one another moves the locking element within the threaded channel. At block 320, the method can further include interlocking the first and second components together by moving the locking element of the second component along the threaded channel of the first component until the locking element of the second component is placed into an interlocked position within an engaging recess of the threaded channel. Additionally, at block 330, the method can include compressing, by the first and second components, a gasket at the interface between the first component and the second component as the first component rotates about the second component so as to form the acoustic seal at the interface.

As noted above, achieving acoustic seal typically includes dispensing glue along the perimeter of the interface that is to be sealed, or an external compression force on elastomer gasket, such as a compression force created by screws, to ensure a seal along the interface perimeter. These traditional methods diminish the cosmetic appearance of a device, as well as require additional components to create external force, such as screws, which further add time and cost to the overall manufacturing of the device. The methods disclosed here can overcome these shortcomings by providing assemblies, systems, methods and devices that can achieve an acoustic seal, without compromising the aesthetic appearance of additional comments, or the related problems associated with the use of additional components to form acoustic seal. Additionally, formation of the acoustic seal can meet high Ingress protection standards and/or hermetic volume within the device.

It is to be appreciated that the aforementioned locking assemblies can be implemented within various devices or products. For example, the assemblies disclosed herein may be implemented with various electronic devices, including smart jewelry, watches, and the like. Products, containers, and the like in the healthcare or food industry can also incorporate features disclosed herein. For example, biological sample containers, testing containers, food storage or sample containers, and any other application where it may be desired to have a contaminant and/or tamper-free product or container can benefit from the features disclosed herein. Additionally, although achieving an acoustic seal is desired for the electronic device examples provided herein, the same features may be implemented in devices where it may not be necessary to achieve an acoustic seal.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same or similar reference numbers in different drawings can identify the same or similar elements.

The invention claimed is:

1. An acoustically-sealed electronic device assembly comprising:
- a first housing component having a locking element, the locking element including an engaging element;
- a second component having a threaded channel extending at least partially along a perimeter of the second component, the threaded channel sized to receive the locking element and including:
  - an engaging recess having a wall surface, the engaging element configured to engage the wall surface of the engaging recess; and
  - a first leading end and a second opposed end, the engaging element positioned between the first leading end and the second opposed end of the locking element; and
- a sealing element positioned at an interface between the first housing component and the second component,
- the sealing element compressed by the first housing component and the second component to form an acoustic seal at the interface respondent to the locking element of the first housing component being moved from a first non-engaged position to a second engaged position within the threaded channel of the second component.

2. The device assembly of claim 1, wherein the device assembly is an earbud assembly and the second component is a cap overlying the first housing component.

3. The device assembly of claim 2, wherein the threaded channel is a plurality of threaded channels extending along the perimeter, the locking element is a plurality of locking elements, and movement of the cap around a portion of the first housing component causes movement of the locking elements along the threaded channel.

4. The device assembly of claim 3, wherein the first housing component further includes a volume and the volume becomes a hermetic volume respondent to the acoustic seal being formed at the interface.

5. The device assembly of claim 1, wherein the interface is a first interface and the sealing element is a first gasket, the device assembly further includes a second interface and a second gasket, and an acoustic seal is formed at the second interface respondent to the second gasket being compressed.

6. The device assembly of claim 1, wherein the engaging element is a projection extending away from a main body of the locking element and configured to engage the engaging recess.

7. The device assembly of claim 1, wherein the locking element is a cantilever having a first free end and a second opposed fixed end, the cantilever configured to move from a first biased position to a second compressed position within the threaded channel.

8. The device assembly of claim 7, wherein the engaging recess is positioned at a first end of the threaded channel and the engaging element of the locking element is positioned within the engaging recess.

9. An acoustic seal system comprising:
- a sealing element coupled to a first component and extending around a perimeter of a first component, the sealing element configured to engage a second component at an interface; and
- a locking assembly for securing the first and second components together, the locking assembly comprising:
  - a locking element on one of the first and second components, the locking element including an engaging element; and
  - a threaded channel on an other of the first and second components, the threaded channel including:
    - an engaging recess having a wall surface, the engaging element configured to engage the wall surface of the engaging recess; and
    - a first leading end and a second opposed end, the engaging element positioned between the first leading end and the second opposed end of the locking element, the sealing element compressed so as to form an acoustic seal at the interface respondent to the locking element being moved through the threaded channel.

10. The acoustic seal system of claim 9, wherein the interface is a first interface, the sealing element is a first sealing element, and the acoustic seal is a first acoustic seal, the seal system further comprising a second sealing element coupled to the second component and extending around a perimeter of the second component, the second sealing element configured to engage the first component at a second interface.

11. The system of claim 9, wherein one of the first and second components is a cap of an earbud assembly and an other of the first and second components is a housing of the earbud assembly, the cap configured to enclose the housing when the locking element is moved through the threaded channel.

12. The system of claim 9, further comprising an interior volume formed by the securing of the first and second components together, wherein when the acoustic seal is formed at the interface, the interior volume is a hermetic volume.

13. The system of claim 10, wherein the first sealing element is a first flexible gasket and the second sealing element is a second flexible gasket.

14. The system of claim 9, wherein the locking element is a cantilever having a first free end and a second opposed fixed end, the cantilever configured to move from a first biased position to a second compressed position within the threaded channel.

15. A method of forming an acoustic seal at an interface between a first component and a second component of an electronic device, the method comprising:

rotating the first component and the second component relative to one another, the first component including a locking element and the second component including a threaded channel extending around at least a portion of a perimeter of the second component, the rotation configured to move the locking element along the threaded channel;

interlocking the first and second components together by moving the locking element of the second component along the threaded channel of the first component until the locking element of the second component is placed into an interlocked position within an engaging recess of the threaded channel; and compressing, by the first and second components, a flexible sealing element at the interface between the first component and the second component as the first component rotates about the second component so as to form the acoustic seal at the interface.

16. The method of claim 15, wherein the flexible sealing element is a gasket and the method further comprises compressing the gasket until the first and second components are interlocked so as to form the acoustic seal.

17. The method of claim 15, wherein the electronic device is an earbud assembly, one of the first and second components is a cap, and an other of the first and second components is a housing, wherein interlocking the cap and housing further comprises forming a an interior hermetic volume within the cap and the housing.

18. An acoustically-sealed electronic device assembly comprising:

a first housing component having a locking element;

a second component having a threaded channel extending at least partially along a perimeter of the second component, the threaded channel sized to receive the locking element, the threaded channel having an entrance and a main passageway; and a sealing element positioned at an interface between the first housing component and the second component, wherein:

when the locking element of the first housing component is moved from a first non-engaged position to a second engaged position within the threaded channel of the second component, the sealing element is compressed by the first housing component and the second component to form an acoustic seal at the interface;

the threaded channel further includes an engaging recess having a wall surface, and wherein the locking element includes an engaging element configured to engage the wall surface of the engaging recess; and the second component includes a release opening within the threaded channel, the release opening extending through a thickness of the second component and being positioned at a point along the main passageway where the locking element can be compressed so that a secondary device is insertable into the release opening to release the locking element from the threaded channel.

19. The device assembly of claim 18, wherein the device assembly is an earbud assembly, and the second component is a cap overlying the first housing component.

20. The device assembly of claim 19, wherein the threaded channel is a plurality of threaded channels extending along the perimeter, and the locking element is a plurality of locking elements, and wherein movement of the cap around a portion of the first housing component causes movement of the locking elements along the threaded channel.

21. The device assembly of claim 20, wherein the first housing component further includes a volume and wherein when the acoustic seal is formed at the interface, the volume becomes a hermetic volume.

22. The device assembly of claim 18, wherein the interface is a first interface and the sealing element is a first gasket, and wherein the device assembly further includes a second interface and a second gasket, and wherein when the second gasket is compressed, a second acoustic seal is formed at the second interface.

23. The device assembly of claim 18, wherein the locking element further includes a first leading end and a second opposed end, and wherein the engaging element is positioned between the first leading end and the second opposed end of the locking element.

24. The device assembly of claim 23, wherein the engaging element is a projection extending away from a main body of the locking element and configured to engage the engaging recess.

25. The device assembly of claim 18, wherein the locking element is a cantilever having a first free end and a second opposed fixed end, wherein the cantilever is configured to move from a first biased position to a second compressed position within the threaded channel.

26. The device assembly of claim 25, wherein the engaging recess is positioned at a first end of the threaded channel, and wherein the engaging element of the locking element is positioned within the engaging recess.

* * * * *